(12) United States Patent
Hashimoto et al.

(10) Patent No.: US 11,738,468 B2
(45) Date of Patent: Aug. 29, 2023

(54) ROBOT SYSTEM

(71) Applicant: KAWASAKI JUKOGYO KABUSHIKI KAISHA, Kobe (JP)

(72) Inventors: Yasuhiko Hashimoto, Kobe (JP); Nobuyasu Shimomura, Kobe (JP); Masayuki Kamon, Akashi (JP); Hideyuki Ryu, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 585 days.

(21) Appl. No.: 16/613,288

(22) PCT Filed: May 16, 2018

(86) PCT No.: PCT/JP2018/018919
§ 371 (c)(1),
(2) Date: Nov. 13, 2019

(87) PCT Pub. No.: WO2018/212234
PCT Pub. Date: Nov. 22, 2018

(65) Prior Publication Data
US 2021/0114229 A1 Apr. 22, 2021

(30) Foreign Application Priority Data

May 19, 2017 (JP) .................................. 2017-100368

(51) Int. Cl.
*G05B 15/00* (2006.01)
*G05B 19/00* (2006.01)
(Continued)

(52) U.S. Cl.
CPC ............. *B25J 13/06* (2013.01); *B25J 9/1689* (2013.01); *B25J 13/02* (2013.01); *B25J 13/025* (2013.01); *B25J 13/088* (2013.01); *B25J 19/061* (2013.01)

(58) Field of Classification Search
CPC . B25J 13/06; B25J 9/1689; B25J 13/02; B25J 13/025; B25J 13/088; B25J 19/061
See application file for complete search history.

(56) References Cited

U.S. PATENT DOCUMENTS

2007/0288124 A1 12/2007 Nagata et al.
2010/0241693 A1 9/2010 Ando et al.
(Continued)

FOREIGN PATENT DOCUMENTS

EP 3 342 545 A1 7/2018
EP 3 342 546 A1 7/2018
(Continued)

OTHER PUBLICATIONS

Katherine J. Kuchenbecker and William McMahan, "Spectral Subtraction of Robot Motion Noise for Improved Event Detection in Tactile Acceleration Signals", University of Pennsylvania Scholarly Commons Departmental Papers (MEAM).291, pp. 1-12, Jun. 2012.
(Continued)

*Primary Examiner* — Harry Y Oh
*Assistant Examiner* — Sohana Tanju Khayer
(74) *Attorney, Agent, or Firm* — Oliff PLC

(57) ABSTRACT

A robot system includes a robot configured to perform a work to a workpiece, and a user interface configured to remotely manipulate the robot. The robot includes a robotic arm, a robot hand attached to the robotic arm and configured to perform the work to the workpiece, and an acceleration sensor attached to the robot hand. The robot system further includes a speaker configured to output an acceleration signal from the acceleration sensor as perceptual information.

4 Claims, 10 Drawing Sheets

(51) Int. Cl.
    *B25J 13/06*     (2006.01)
    *B25J 13/02*     (2006.01)
    *B25J 13/08*     (2006.01)
    *B25J 19/06*     (2006.01)
    *B25J 9/16*     (2006.01)

(56) References Cited

U.S. PATENT DOCUMENTS

| | | | |
|---|---|---|---|
| 2015/0165620 A1* | 6/2015 | Osaka | B25J 13/088 |
| | | | 700/250 |
| 2017/0106535 A1* | 4/2017 | Yamaoka | B25J 13/088 |
| 2017/0182374 A1* | 6/2017 | Binder | G08B 21/182 |
| 2018/0071047 A1 | 3/2018 | Suzuki et al. | |
| 2018/0293768 A1* | 10/2018 | Ooshima | B25J 19/02 |
| 2019/0028580 A1* | 1/2019 | Hosoi | H04M 1/0264 |
| 2019/0217477 A1* | 7/2019 | Paepcke | G05B 19/4189 |
| 2019/0344440 A1* | 11/2019 | Yamaoka | B25J 9/1653 |
| 2019/0358825 A1* | 11/2019 | Imai | B25J 9/1661 |
| 2020/0406483 A1* | 12/2020 | Hirose | G01L 5/0076 |

FOREIGN PATENT DOCUMENTS

| | | |
|---|---|---|
| EP | 3 342 565 A1 | 7/2018 |
| JP | 5177136 B2 | 4/2013 |
| JP | 2016-214715 A | 12/2016 |
| JP | WO2017/033378 A1 | 6/2018 |
| JP | WO2017/033380 A1 | 6/2018 |
| JP | WO2017/033381 A1 | 6/2018 |

OTHER PUBLICATIONS

Ken Sasaki et al. "Bilateral Control for Remote Control With Signal for Tactile Presentation Superimposed", Journal of the Japan Society for Precision Engineering, vol. 69, No. 1, pp. 053-057, 2003 (year sufficiently old that month is not at issue).

* cited by examiner

AXa  55a  AXb  55b

ROBOT SYSTEM

TECHNICAL FIELD

The present disclosure relates to a robot system.

BACKGROUND ART

Conventionally, a robot system is known, which is provided with a robot which performs a work to a workpiece, and a user interface for remotely manipulating the robot. As such a robot system, for example, there is a remote control system disclosed in Patent Document 1.

The remote control system of Patent Document 1 performs a matching of a to-be-operated device with an operation terminal which manipulates the to-be-operated device from a remote location by a server on a communication network, and remotely manipulates the to-be-operated device from the operation terminal according to the matching to perform a task.

REFERENCE DOCUMENT OF CONVENTIONAL ART

Patent Document

[Patent Document 1] JP5177136B2

DESCRIPTION OF THE DISCLOSURE

Problems to be Solved by the Disclosure

Meanwhile, in the remote control system of Patent Document 1, a camera, a microphone, etc. are provided to the to-be-operated device end (i.e., the robot end), and video information, sound information, etc. which are acquired by the camera, the microphone, etc. are supplied to the operation terminal end (i.e., the user interface end). Therefore, the operator remotely operates the robot while grasping a work situation at the robot end to perform the work. However, based on the video information and the sound information supplied at this time, it is difficult for the operator to accurately grasp the work situation at the robot end. For example, in the case of the sound information, since all the noise generated in a factory is supplied, it is difficult to accurately grasp the work situation at the robot end. As a result, there is a problem that the remote control system of Patent Document 1 may be unable to perform a desired work.

Therefore, one purpose of the present disclosure is to provide a robot system which can ensure a desired work by remotely operating a robot, while accurately grasping a work situation at the robot end.

SUMMARY OF THE DISCLOSURE

In order to solve the above problems, a robot system according to the present disclosure includes a robot configured to perform a work to a workpiece, and a user interface configured to remotely manipulate the robot. The robot includes a robotic arm, an end effector attached to the robotic arm and configured to perform the work to the workpiece, and an acceleration sensor attached to the end effector. The robot system further includes a perceptual-information output part configured to output an acceleration signal from the acceleration sensor as perceptual information.

According to this configuration, noise in a factory etc. which is unnecessary for grasping a work situation at the robot end can be removed, and the acceleration signal from the acceleration sensor can be outputted from the perceptual-information output part as the perceptual information. As a result, the robot system according to the present disclosure is possible to remotely manipulate the robot while accurately grasping the work situation at the robot end, and certainly perform the desired work.

The acceleration sensor may be disposed at or near a location where the acceleration sensor contacts the workpiece.

According to this configuration, the effects of the robot system according to the present disclosure can be further improved.

The robot system may further include an acceleration signal processor configured to filter the acceleration signal acquired by the acceleration sensor to pass only a particular frequency component. The perceptual-information output part may output the acceleration signal of the particular frequency component as the perceptual information.

According to this configuration, the effects of the robot system according to the present disclosure can be further improved.

The perceptual information may be sound information, and the perceptual-information output part may be a speaker configured to output the acceleration signal as the sound information.

According to this configuration, the perceptual-information output part can output clear sound information (i.e., sound information with less noise) which does not include all the noise generated in the factory as compared with the sound information acquired by, for example, a conventionally existing microphone. This is because the acceleration sensor is difficult to collect noise caused by aerial vibration as compared with the microphone. Therefore, it becomes possible to certainly give an operator comparatively small sound information, for example, like when the end effector rubs against the workpiece.

The speaker may be provided at or near the user interface.

According to this configuration, the operator can certainly catch the sound information outputted from the speaker. Therefore, the effects of the robot system according to the present disclosure can be further improved.

The perceptual information may be exciting-force information, and the perceptual-information output part may be a vibrator configured to output the acceleration signal as the exciting-force information, and may be provided to the user interface.

According to this configuration, the operator can percept the exciting-force information, and thus it becomes possible to remotely manipulate the robot while accurately grasping the work situation at the robot end, and certainly perform the desired work.

Effect of the Disclosure

The present disclosure can provide the robot system which can ensure the desired work by remotely operating the robot, while accurately grasping the work situation at the robot end.

BRIEF DESCRIPTION OF DRAWINGS

FIG. 10(a) is a perspective view, and FIG. 10(b) is a cross-sectional view along a plane where the height direction and the width direction intersect with each other.

MODES FOR CARRYING OUT THE DISCLOSURE (Entire Configuration)

Figure 1:
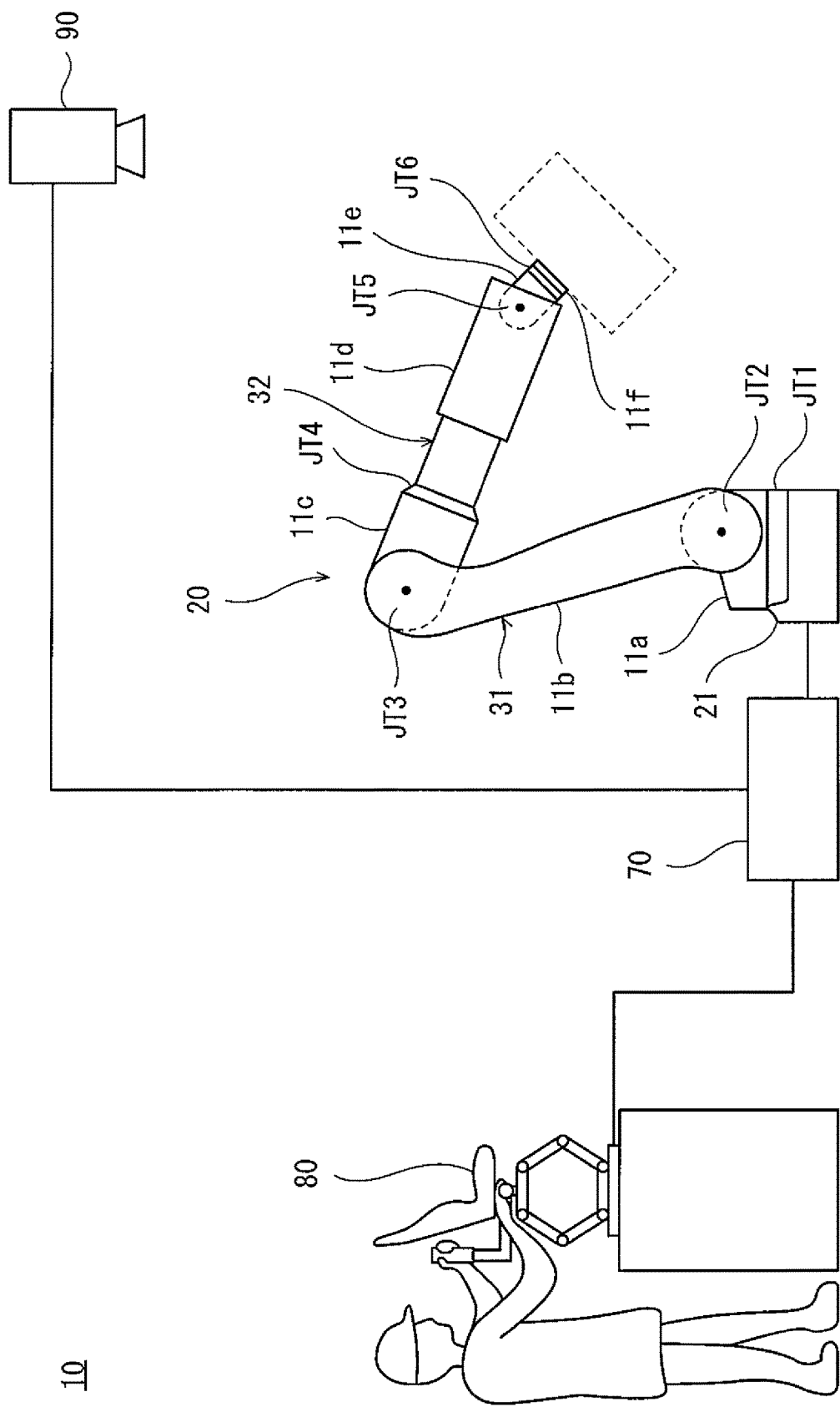
FIG. 1 is a schematic diagram illustrating an entire configuration of a robot system according to one embodiment of the present disclosure.
Figure 2:
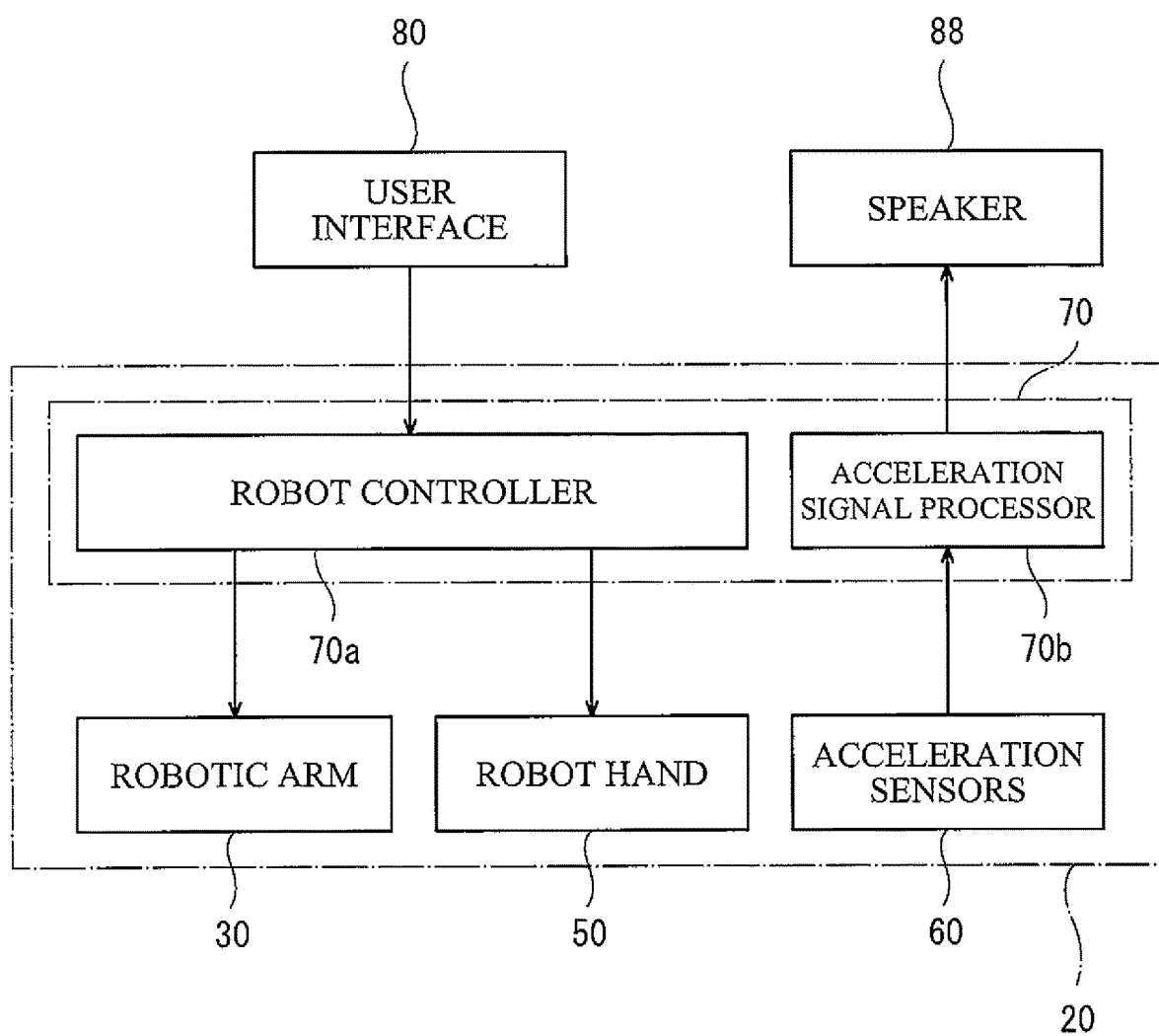
FIG. 2 is a block diagram illustrating a configuration of a control system of the robot system according to one embodiment of the present disclosure.

Hereinafter, a robot system according to one embodiment of the present disclosure is described with reference to the drawings. FIG. 1 is a schematic diagram illustrating the entire configuration of the robot system according to one embodiment of the present disclosure. FIG. 2 is a block diagram illustrating a configuration of a control system of the robot system according to one embodiment of the present disclosure.

A robot system 10 according to this embodiment performs a part of an assembly work of an automobile. In detail, the robot system 10 performs an attachment work to attach a seat part (a workpiece W) of the automobile which is a work object to the vehicle body.

The robot system 10 according to this embodiment includes a robot 20 which actually performs the work described above to the workpiece W, a user interface 80 which remotely manipulates the robot 20, and a camera 90 which images a work situation of the robot 20 to acquire video information.

(Robot 20)

The robot 20 includes a pedestal 21, a robotic arm 30 coupled to the pedestal 21, a robot hand 50 (end effector) which is attached to a tip-end part of the robotic arm 30 and performs the work to the workpiece W, acceleration sensors 60 attached to the robot hand 50, and a controller 70 which controls the robot 20. Note that, in FIG. 1, the robot hand 50 and the acceleration sensors 60 are provided inside a black box surrounded by a broken line.

(Robotic Arm 30)

As illustrated in FIG. 1, the robotic arm 30 is an articulated arm having six joints JT1-JT6, and six links 11a-11f serially coupled through these joints. In detail, the first joint JT1 couples the pedestal 21 to a base-end part of the first link 11a rotatably on an axis extending vertically. The second joint JT2 couples a tip-end part of the first link 11a to a base-end part of the second link 11b rotatably on an axis extending horizontally. The third joint JT3 couples a tip-end part of the second link 11b to a base-end part of the third link 11c rotatably on an axis extending horizontally. The fourth joint JT4 couples a tip-end part of the third link 11c to a base-end part of the fourth link 11d rotatably on an axis extending in the longitudinal direction of the third link 11c. The fifth joint JT5 couples a tip-end part of the fourth link 11d to a base-end part of the fifth link 11e rotatably on an axis extending in a direction perpendicular to the longitudinal direction of the fourth link 11d. The sixth joint JT6 rotatably couples a tip-end part of the fifth link 11e to a base-end part of the sixth link 11f in a twisting manner. The robot hand 50 which performs the work to the workpiece W is attached to a tip-end part of the sixth link 11f (i.e., inside the black box surrounded by the broken line in FIG. 1).

An arm part 31 of the robotic arm 30 is comprised of a coupled body of the links and the joints, comprised of the first joint JT1, the first link 11a, the second joint JT2, the second link 11b, the third joint JT3, and the third link 11c. Moreover, a wrist part 32 of the robotic arm 30 is comprised of a coupled body of the links and the joints, comprised of the fourth joint JT4, the fourth link 11d, the fifth joint JT5, the fifth link 11e, the sixth joint JT6, and the sixth link 11f. Note that the robotic arm 30 constitutes a robot body.

(Robot Hand 50)

Figure 3:
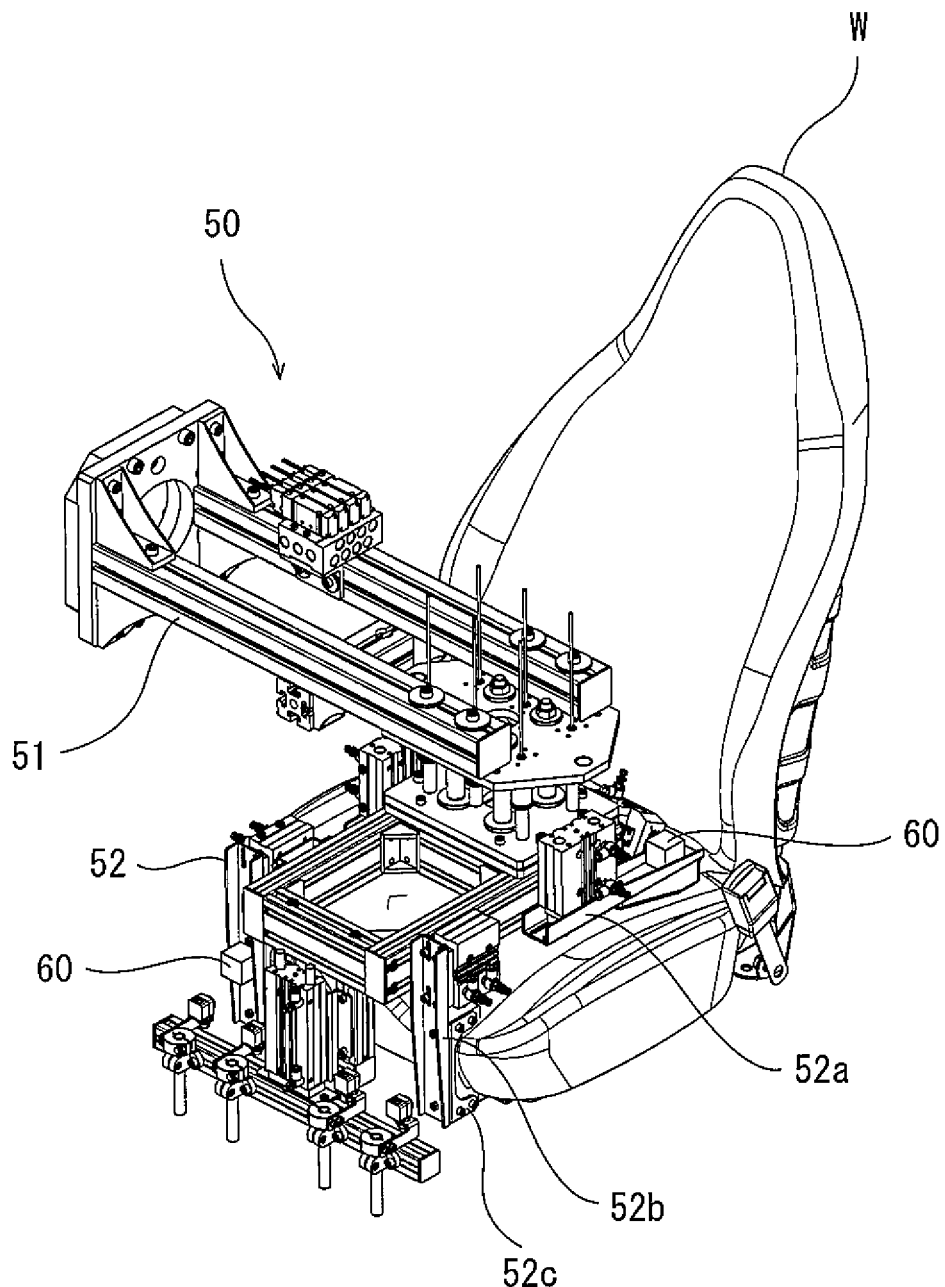
FIG. 3 is a perspective view when holding a workpiece using the robot system according to one embodiment of the present disclosure.
Figure 4:
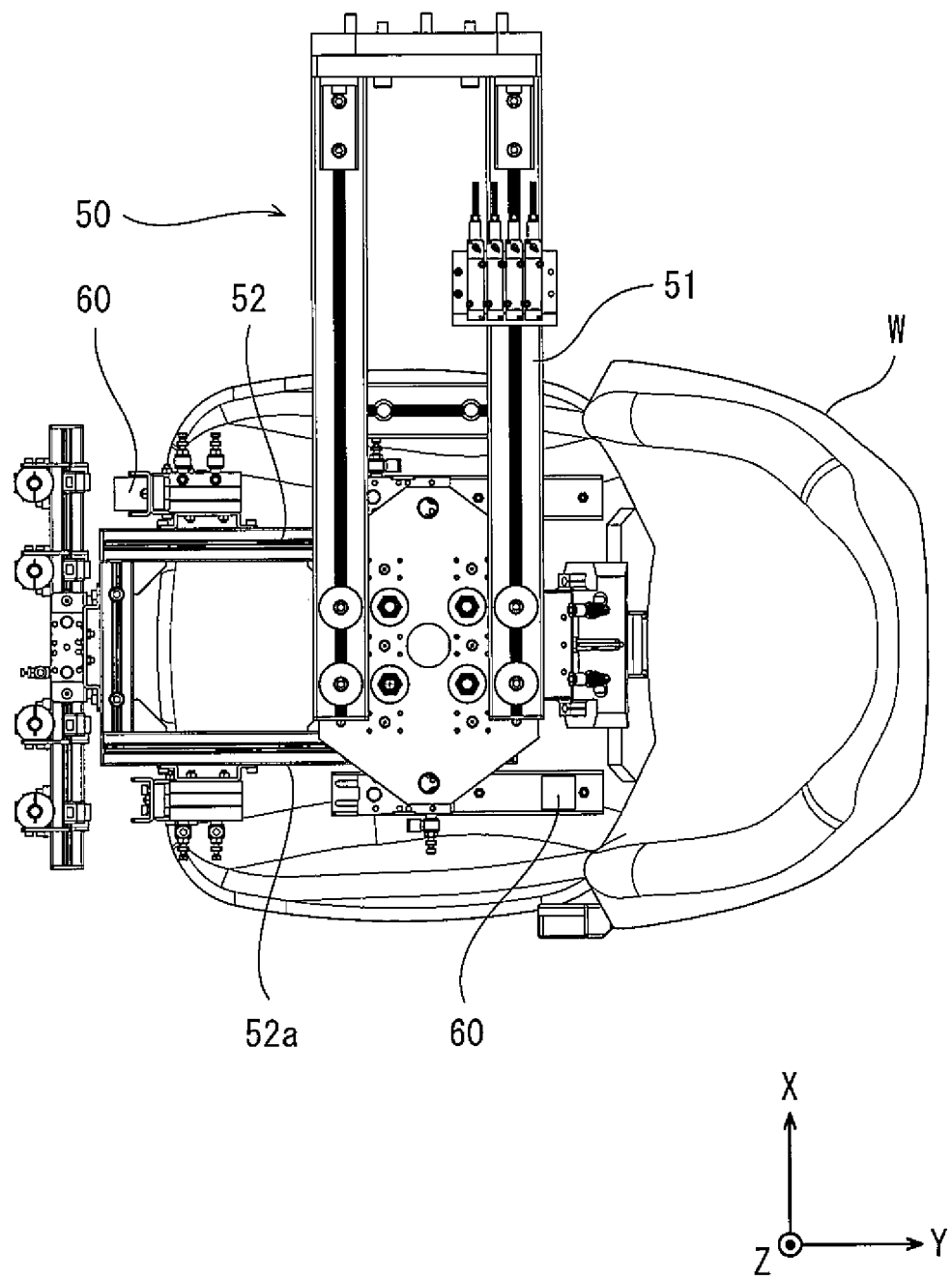
FIG. 4 is a plan view when holding the workpiece using the robot system according to one embodiment of the present disclosure.
Figure 5:
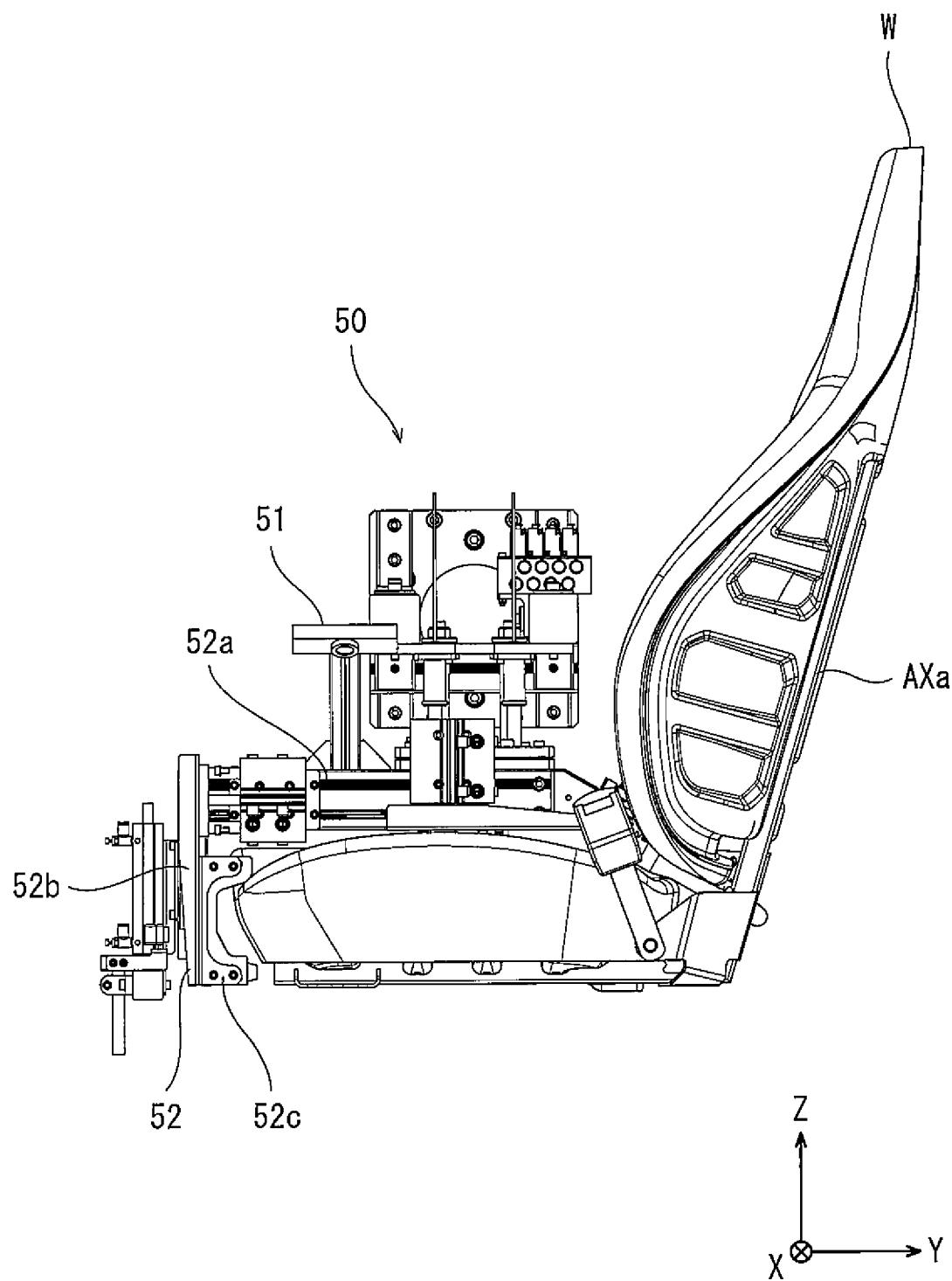
FIG. 5 is a left side view when holding the workpiece using the robot system according to one embodiment of the present disclosure.
Figure 6:
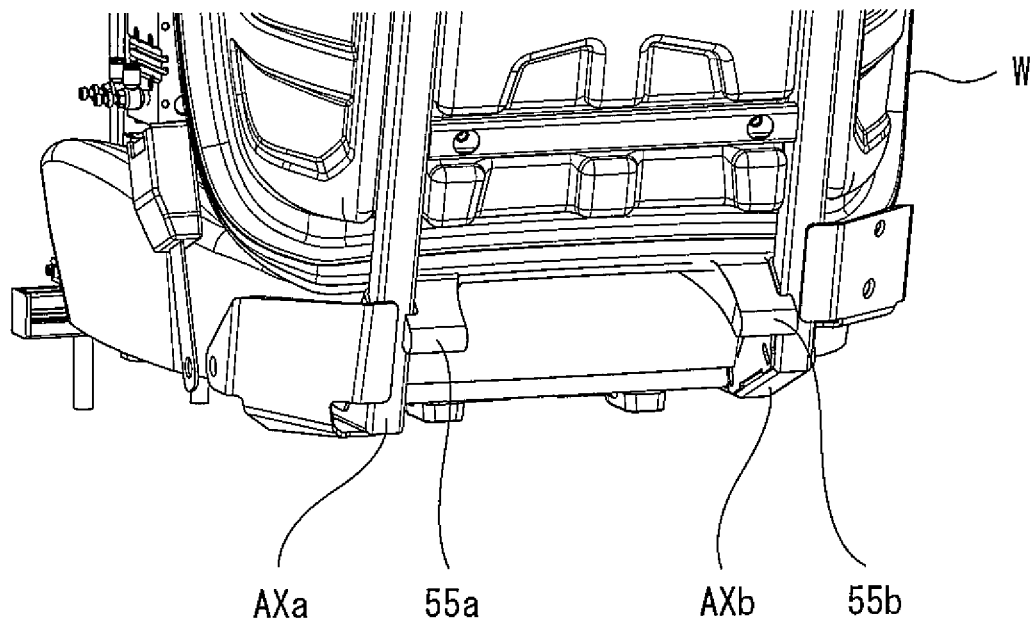
FIG. 6 is a partially enlarged view of the perspective view, seen from the rear side when holding the workpiece using the robot system according to one embodiment of the present disclosure.
Figure 6:
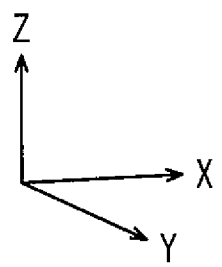

Next, mainly referring to FIGS. 2 to 7, a structure of the robot hand 50 is described, using a state where the workpiece W is held as one example. FIG. 3 is a perspective view when holding the workpiece using the robot system according to one embodiment of the present disclosure. Moreover, FIG. 4 is a plan view of the same, and FIG. 5 is a left side view of the same. Further, FIG. 6 is a partially enlarged view of the perspective view of the same, seen from a rear side, and FIGS. 7(a) and 7(b) are partially enlarged views of the perspective view of FIG. 3.

Here, the workpiece W according to this embodiment is the seat to be attached to the automobile, as described above. The workpiece W includes a seat part, a backrest part connected to the seat part, and two shaft members AXa and AXb provided along the rear surfaces of the seat part and the backrest part and connecting the seat part and the backrest part to each other.

The robot hand 50 is attached to the robotic arm 30, and performs the work to the workpiece W. The robot hand 50 has a first hand part 51 extending in the illustrated X-direction, and a second hand part 52 coupled to an under side of the first hand part 51.

The second hand part 52 has a first part 52a extending along an upper surface of the seat part of the workpiece W, a second part 52b connected to a front end of the first part 52a extending along a front surface of the seat part, and a third part 52c connected to a lower end part of the second part 52b and extending along a bottom surface of the seat part.

As illustrated in FIG. 6, the first part 52a described above has two support parts 55a and 55b extending rearwardly (toward positive in the Y-direction in this figure) while inclining downwardly (toward negative in the Z-direction in this figure). The two support parts 55a and 55b are each reciprocatable in the X-direction by a given distance. As illustrated in FIG. 6, a rear end part (a positive end part in the Y-direction in this figure) of each of the two support parts 55a and 55b penetrates a gap formed between the seat part and the backrest part of the workpiece W and reaches the rear surface side of the workpiece W.

As illustrated in FIG. 5, the second hand part 52 holds a front end part of the workpiece W by the first part 52a, the second part 52b, and the third part 52c. Moreover, as illustrated in FIG. 6, the second hand part 52 holds a rear end part of the workpiece W by the support part 55a contacting one shaft member AXa of the workpiece W from inside and applying an external force outwardly, and the support part 55b contacting the other shaft member AXb of the workpiece W from inside and applying an external force outwardly. Thus, the second hand part 52 can hold the whole workpiece W.

(Acceleration Sensors 60)

Figure 7B:
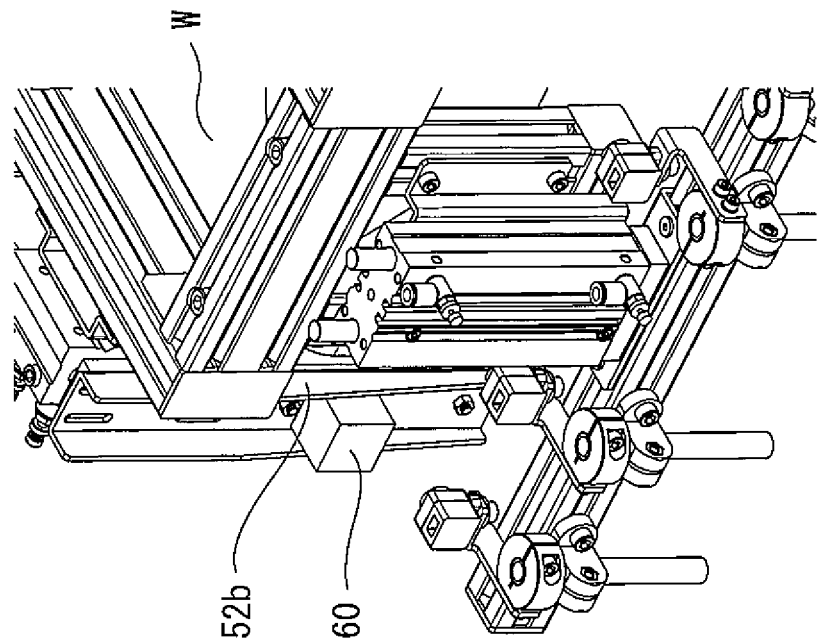
FIGS. 7(a) and 7(b) are partially enlarged views of the perspective view when holding the workpiece using the robot system according to one embodiment of the present disclosure.
Figure 7A:
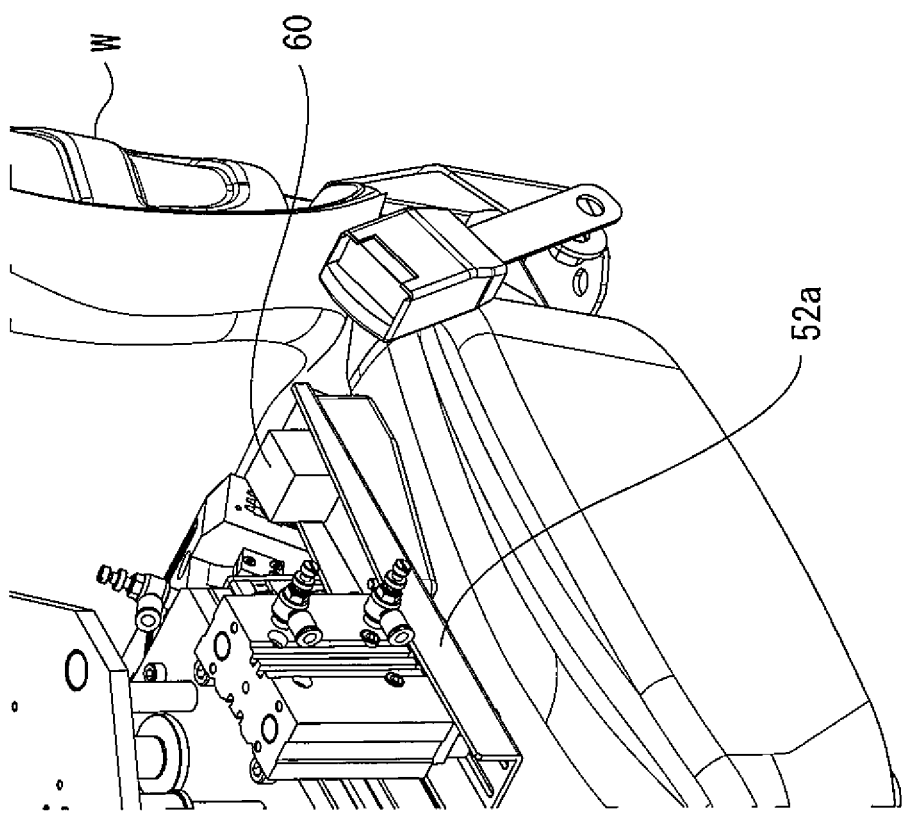

As illustrated in FIGS. 7(a) and 7(b), the acceleration sensor 60 is attached to a location of the first part 52a of the second hand part 52 near the positive end part in the Y-direction (i.e., near the connection of the seat part and the backrest part of the workpiece W), and a location of the second part 52b near the positive end in the X-direction (i.e., a location along the right part of the front surface of the seat part of the workpiece W). Thus, the acceleration sensor 60 is desirably provided at or near a location contacting the workpiece W.

The acceleration sensor 60 supplies to the user interface 80 an acceleration signal acquired when the robot hand 50 operates. Here, perceptual information is, for example, information which can be sensed by a human, such as sound information and exciting-force information.

(User Interface 80)

Figure 8:
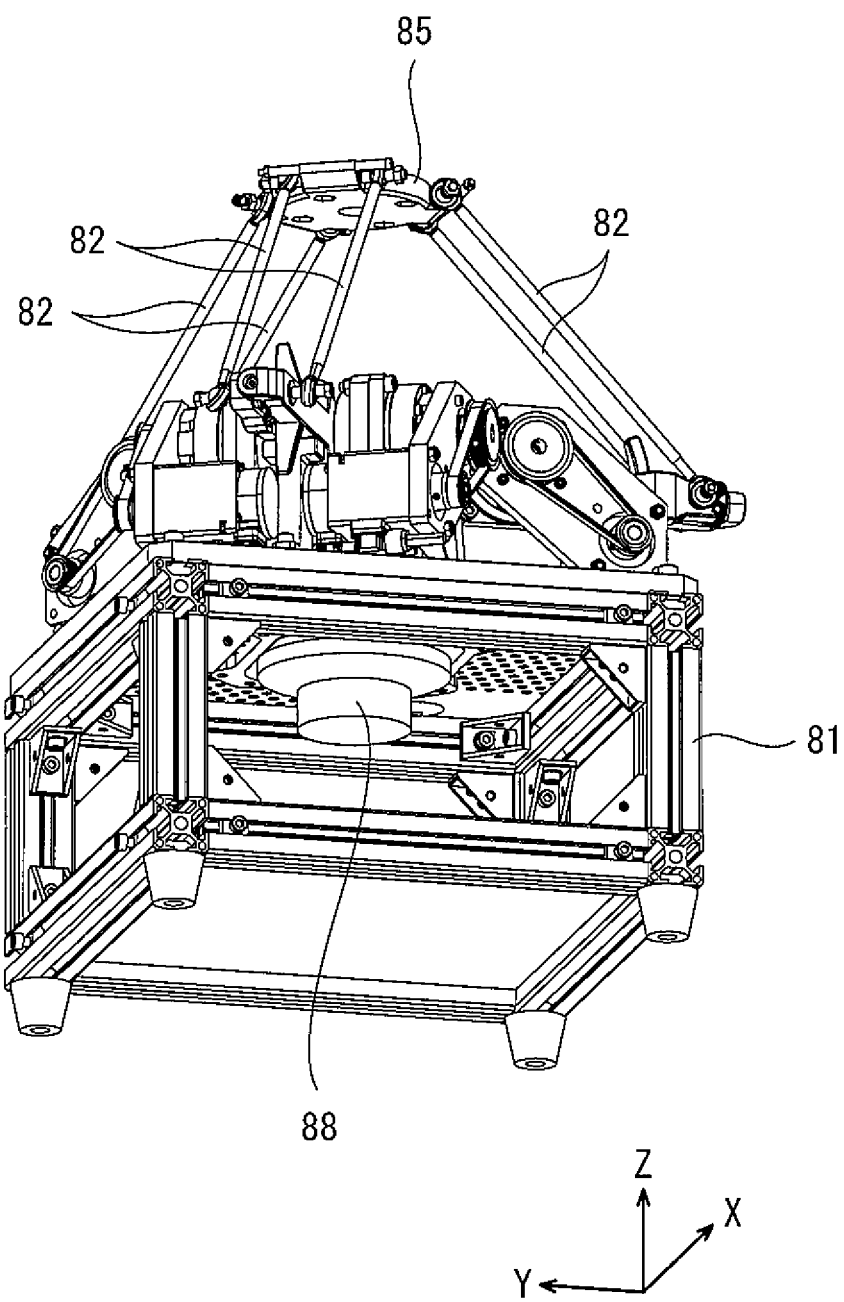
FIG. 8 is a perspective view of a user interface provided to the robot system according to one embodiment of the present disclosure, when seen from the bottom side.

Further, mainly referring to FIGS. 2 and 8, the user interface 80 according to one embodiment of the present disclosure is described. FIG. 8 is a perspective view of the user interface provided to the robot system according to one embodiment of the present disclosure, when seen from the bottom side.

The user interface 80 is installed so as to be separated from the robot 20 by a given distance, and remotely operates the robotic arm 30 and the robot hand 50 based on a manual operational instruction from an operator. As illustrated in FIG. 8, the user interface 80 includes a base part 81 formed in a substantially hollow rectangular parallelepiped shape by connecting a plurality of frames to each other, a plurality of master arms 82 attached so as to extend substantially upwardly from the top side of the base part 81, a workpiece model installation part 85 to which tip-end parts of the plurality of master arms 82 are connected at an edge part thereof, and including a principal surface for installing a workpiece model (not illustrated) which imitates the workpiece W, and a speaker 88 (perceptual-information output part) attached to the bottom surface of the top plate of the base part 81.

Each of the plurality of master arms 82 is fixed to the top surface of the base part 81 by connecting the root part thereto, and has at least one joint. According to such a structure, it is possible for the tip-end parts of the plurality of master arms 82 to freely operate within a given range in the illustrated X-direction, Y-direction, and Z-direction. Thus, the workpiece model installation part 85 is possible to freely operate so as to be interlocked with each of the tip-end parts of the plurality of master arms 82.

The user interface 80 generates operational information by the operator moving the workpiece model. The operational information includes, for example, position information and posture information on the workpiece model. The generated operational information is supplied to a robot controller 70a, as illustrated in FIG. 2. The user interface 80 and the robot controller 70a may be connected to each other wiredly or wirelessly.

(Camera 90)

The camera 90 is installed in a space where the robot 20 is provided, and images the workpiece W and the robot 20 which performs the work to the workpiece W. The camera 90 is installed so that the image captured by the camera 90 includes at least the workpiece W and the robot hand 50. As illustrated in FIG. 1, in this embodiment, although the camera 90 is installed so as to image the workpiece W from above, the installed position is not limited in particular. The camera 90 is connected to the controller 70. The camera 90 and the controller 70 may be connected to each other wiredly or wirelessly.

(Controller 70)

As illustrated in the block diagram of FIG. 2, the controller 70 includes the robot controller 70a which controls the robotic arm 30 and the robot hand 50 based on the operational information supplied from the user interface 80, and an acceleration signal processor 70b which processes the acceleration signal supplied from the acceleration sensor 60.

The robot controller 70a controls the robotic arm 30 and the robot hand 50, for example, based on the operational information supplied from the user interface 80. Moreover, the acceleration signal processor 70b filters the acceleration signal to pass only a particular frequency band.

The controller 70 is comprised of an arithmetic part comprised of a microcontroller, a MPU, a PLC (Programmable Logic Controller), a logic circuit, etc., and a memory comprised of a ROM, a RAM, etc.

(Example of Work Mode)

One example of performing the work to the workpiece W using the robot system 10 according to this embodiment is described.

First, the user interface 80 receives the manual operational instruction from the operator to generate the operational information, and supplies the operational information to the robot controller 70a.

At this time, the operator performs the operational instruction to the user interface 80, while accurately grasping the work situation at the robot 20 end based on the video information outputted from a monitor (not illustrated) and the sound information outputted from the speaker 88. Here, the video information outputted from the monitor is an image of the work situation of the robot 20 captured using the camera 90. Moreover, the sound information outputted from the speaker 88 is based on the acceleration signal acquired by the acceleration sensor 60. In detail, the acceleration sensor 60 detects the acceleration signal when the robot 20 performs the work, and supplies the detected acceleration signal to the acceleration signal processor 70b which is a part of the controller 70. Next, the acceleration signal processor 70b filters the acceleration signal to pass only a particular frequency component, and supplies it to the speaker 88. The speaker 88 outputs the acceleration signal of the supplied particular frequency component as the sound information.

Then, the controller 70 controls the robotic arm 30 and the robot hand 50 based on the operational information supplied from the user interface 80.

(Effects)

The robot system 10 according to this embodiment includes the acceleration sensor 60 attached to the robot hand 50, and the speaker 88 (perceptual-information output part) which outputs the acceleration signal from the acceleration sensor 60 as the perceptual information. That is, the robot system 10 according to this embodiment outputs from the speaker 88 the acceleration signal supplied from the acceleration sensor 60 as the perceptual information. Here, the acceleration sensor 60 is difficult to collect noise caused by aerial vibration, for example, as compared with a microphone etc. As a result, the robot system 10 according to this embodiment is possible to remotely manipulate the robot 20 while accurately grasping the work situation at the robot 20 end, thereby ensuring the desired work.

Further, in this embodiment, the acceleration sensor 60 is attached to the location near the connection of the seat part and the backrest part of the workpiece W, and the location along the front surface of the seat part of the workpiece W. That is, in this embodiment, the acceleration sensor 60 is provided at or near the location where the acceleration sensor 60 contacts the workpiece W. Therefore, the above effects of the robot system 10 according to this embodiment can be further improved.

Further, in this embodiment, the perceptual-information output part is the speaker 88 which outputs the acceleration signal as the sound information. Therefore, the robot system 10 according to this embodiment can output clear sound information (i.e., sound information with less noise) which does not include all the noise generated in the factory, for example, as compared with the sound information based on a signal acquired by a conventionally existing microphone. Therefore, the robot system 10 according to this embodiment can certainly give the operator comparatively small sound information, for example, like when the robot hand 50 rubs against the workpiece W.

Moreover, in this embodiment, the speaker 88 is provided to the user interface 80. Therefore, the operator can certainly catch the sound information outputted from the speaker 88. As a result, the effects of the robot system 10 of the present disclosure can be further improved.

Further, in this embodiment, the acceleration signal processor 70b which filters the acceleration signal acquired by the acceleration sensor 60 to pass only the particular frequency component is further provided, and the speaker 88 outputs the acceleration signal of the particular frequency component as the sound information.

According to this configuration, the effects of the robot system 10 of the present disclosure can be further improved.

(Modifications)

Although in one embodiment described above the speaker 88 (perceptual-information output part) is attached to the bottom surface of the top plate of the base part 81 of the user interface 80, it is not limited in this configuration. That is, the speaker 88 may be attached to other parts of the user interface 80, or may be installed near the user interface 80, without being attached to the user interface 80. Further, the speaker 88 may be installed at the position distant from the user interface 80 instead of near the user interface 80, as long as it can output the sound information with a sufficiently large volume to the extent that the operator can accurately grasp the work situation at the robot 20 end. Note that, in the case of a frequency component of a low band, it is also possible to give the operator the output from the speaker 88 as vibration.

Although in one embodiment described above the perceptual-information output part is the speaker 88 which outputs the sound information, it is not limited to this configuration. For example, the perceptual-information output parts may be a headphone which is attached to the operator and outputs the sound information.

Figure 9:
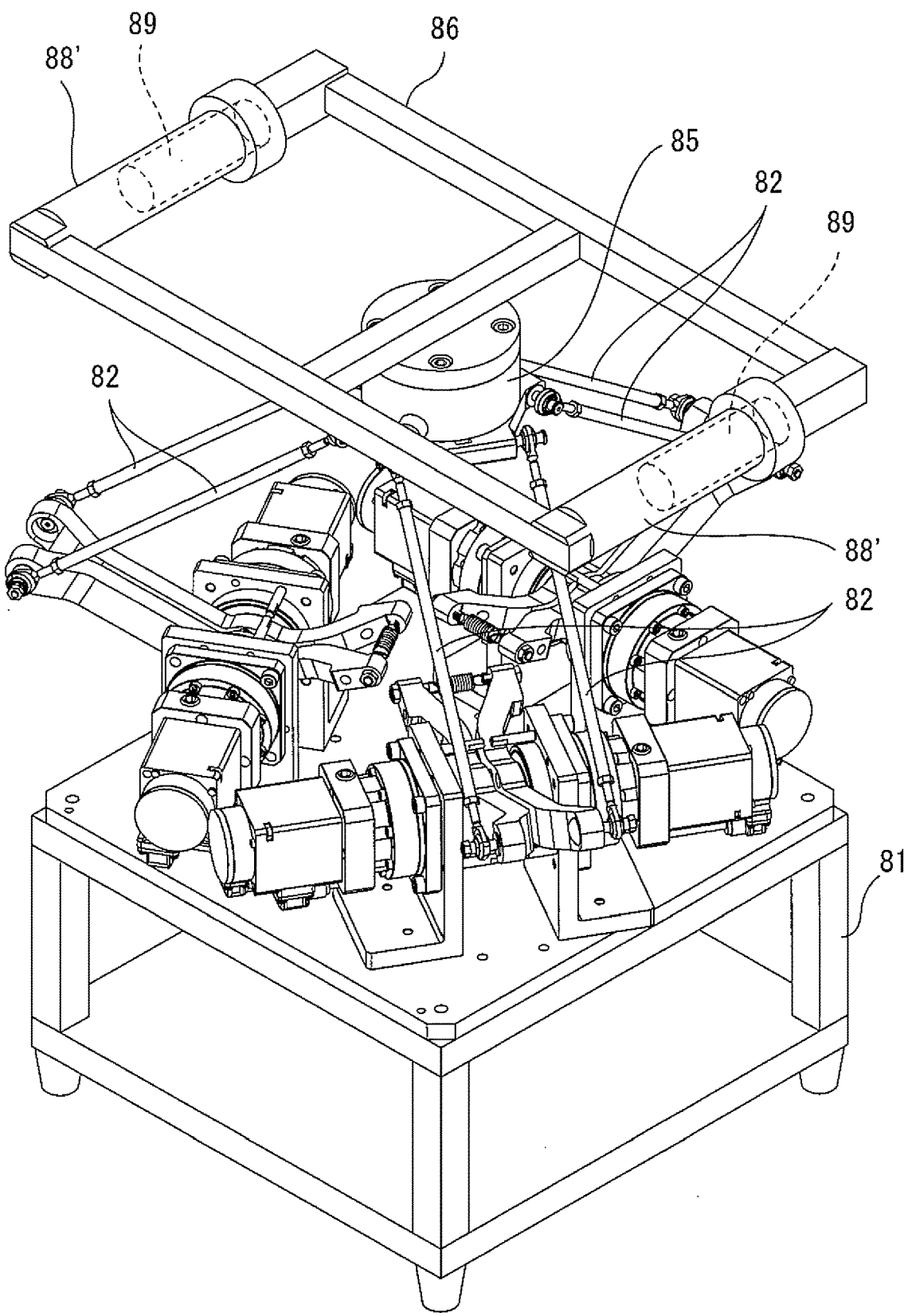
FIG. 9 is a perspective view of the user interface according to one modification of the present disclosure when seen from the top side.

Moreover, the perceptual-information output part is not limited to the speaker 88 and the headphone which outputs the sound information, and, for example, it may be a vibrator 88' which outputs exciting-force information, as illustrated in FIG. 9. FIG. 9 is a perspective view of the user interface according to one modification of the present disclosure when seen from the top side. As illustrated in FIG. 9, in this modification, a grip body 86 having a contour of a substantially rectangular shape in a plan view is installed on an upper surface of the workpiece model installation part 85 of the user interface 80, in order to be gripped by the operator. The grip body 86 has two vibrators 88'. A motor 89 as illustrated by a broken line is built in each vibrator 88'. Each vibrator 88' outputs the exciting-force information by rotating the motor 89, and can give the operator the work situation at the robot 20 end. Note that, although in this modification the vibrator 88' is built in the user interface 80, the location at which the vibrator 88' is provided is not limited in particular, as long as it is provided to the user interface 80. That is, the vibrator 88' may be provided to the user interface 80 so that it is attached to an external surface of the user interface 80.

Figure 10A:
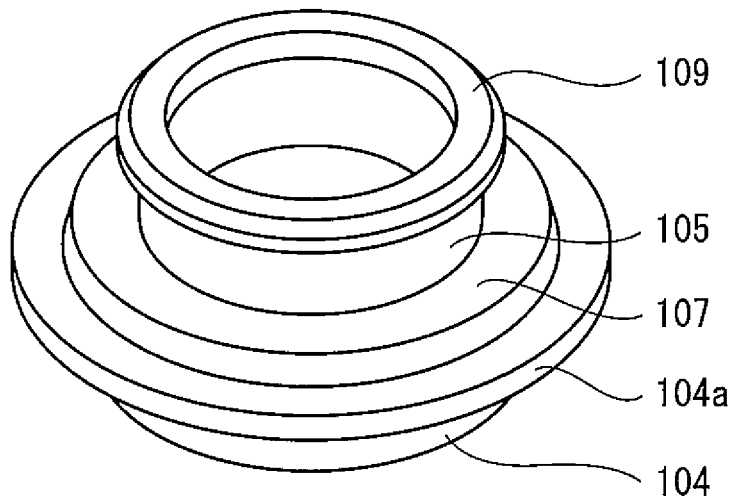
FIGS. 10(a) and 10(b) are views illustrating a transducer according to another modification of the present disclosure, where
Figure 10B:
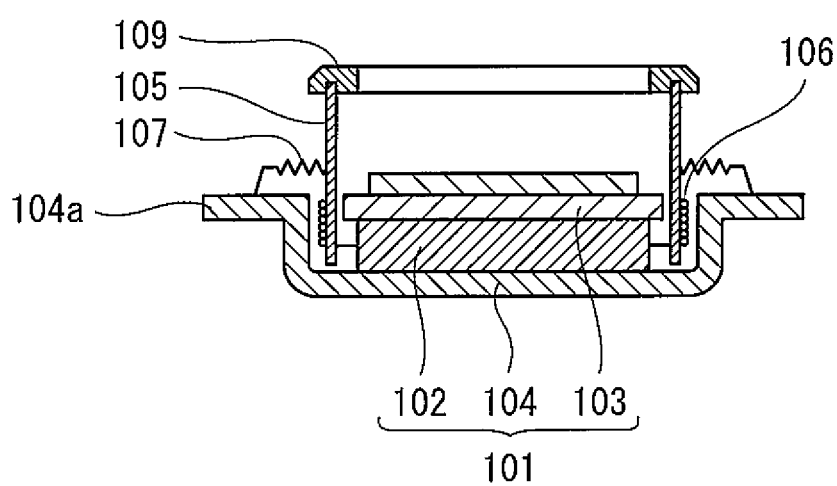

Moreover, for example, the perceptual-information output part may be a transducer 88", as illustrated in FIG. 10. FIGS. 10(*a*) and 10(*b*) are views illustrating a transducer according to another modification of the present disclosure, where FIG. 10(*a*) is a perspective view, and FIG. 10(*b*) is a cross-sectional view along a plane where the height direction and the width direction intersect with each other. The transducer 88" is a perceptual-information output part which can output both the sound information and the exciting-force information, as the perceptual information.

The transducer 88" includes a magnetic circuit 101, a bobbin 105, a voice coil 106, and a suspension 107. The magnetic circuit 101 is mainly comprised of a magnet 102, an inner yoke 103, and an outer yoke 104. The bobbin 105 has a cylindrical shape. The suspension 107 supports the bobbin 105 so that the bobbin 105 is disposed at a given position of the transducer 88". An annular member 109 is provided to a tip end of the bobbin 105. According to such a structure, the bobbin 105 vibrates when electric current flows into the voice coil 106. It becomes possible to give the operator at least one of the sound information and the exciting-force information by attaching and using such a transducer 88" to the user interface 80 in the same way as the speaker 88 illustrated in FIG. 8 so that, for example, the annular member 109 contacts to the top plate of the user interface 80.

Further, although in one embodiment described above the end effector is the robot hand 50 which performs the work to the workpiece W after holding the workpiece W, it is not limited to this configuration, as long as it performs a certain work to the workpiece. For example, the end effector may be a drill for forming an arbitrary hole in the workpiece.

It is apparent for a person skilled in the art that many improvements and other embodiments of the present disclosure are possible from the above description. Therefore, the above description is to be interpreted only as illustration, and it is provided in order to teach a person skilled in the art the best mode that implements the present disclosure. The details of the structure and/or the functions may be changed substantially, without departing from the spirit of the present disclosure.

DESCRIPTION OF REFERENCE CHARACTERS

10 Robot System
20 Robot

21 Pedestal
30 Robotic Arm
31 Arm Part
32 Wrist Part
50 Robot Hand
51 First Hand Part
52 Second Hand Part
52a First Part
52b Second Part
52c Third Part
55a, 55b Support Part
60 Acceleration Sensor
70 Controller
70a Robot Controller
70b Acceleration Signal Processor
80 User Interface
81 Base Part
82 Master Arm
85 Workpiece Model Installation Part
88 Speaker
88' Vibrator
88" Transducer
90 Camera
W Workpiece

What is claimed is:

1. A robot system comprising:
a robot configured to perform a work to a workpiece, and a user interface configured to remotely manipulate the robot, wherein the robot includes:
a robotic arm,
an end effector attached to the robotic arm and configured to perform the work to the workpiece, and
an acceleration sensor attached to the end effector and configured to acquire an acceleration signal; and
an acceleration signal processor configured to filter the acceleration signal acquired by the acceleration sensor to pass only a particular frequency component,
wherein the robot system further comprises at least one of:
a speaker configured to receive the particular frequency component as the acceleration signal, and output the particular frequency component as sound information;
a headphone configured to receive the particular frequency component as the acceleration signal, and output the particular frequency component as the sound information;
a vibrator configured to receive the particular frequency component as the acceleration signal, and output the particular frequency component as exciting-force information; and
a transducer configured to receive the particular frequency component as the acceleration signal, and output the particular frequency component as the sound information and the exciting-force information.

2. The robot system of claim 1, wherein the acceleration sensor is disposed at or near a location where the acceleration sensor contacts the workpiece.

3. The robot system of claim 1, wherein the speaker is provided at or near the user interface.

4. The robot system of claim 1, wherein the vibrator is provided to the user interface.

* * * * *